March 10, 1970     G. J. SLOAN, JR     3,499,325
ATMOSPHERIC DETERMINING APPARATUS
Filed Dec. 7, 1967     2 Sheets-Sheet 1

INVENTOR
George J. Sloan, Jr.
BY
ATTORNEY
AGENT

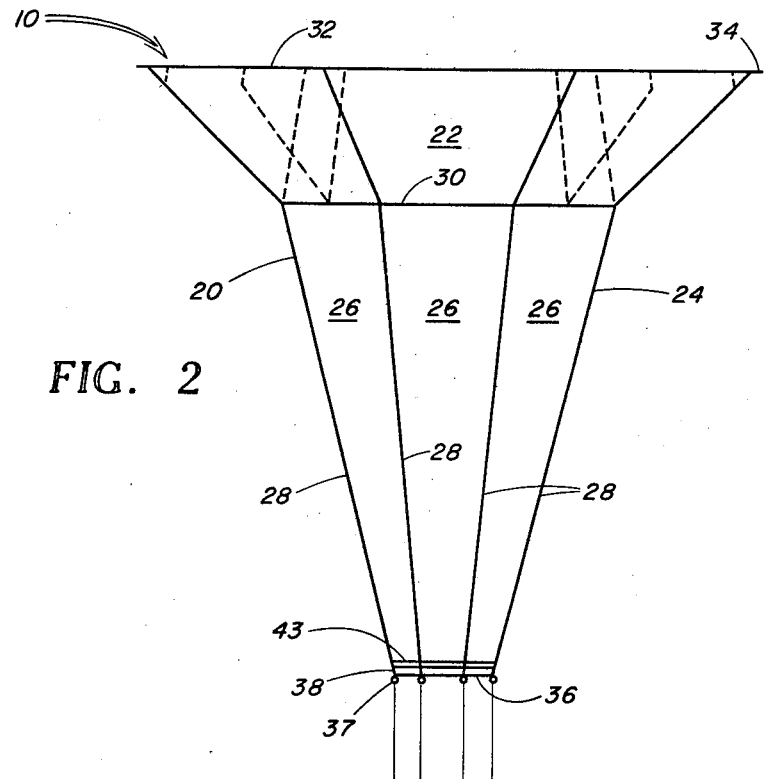
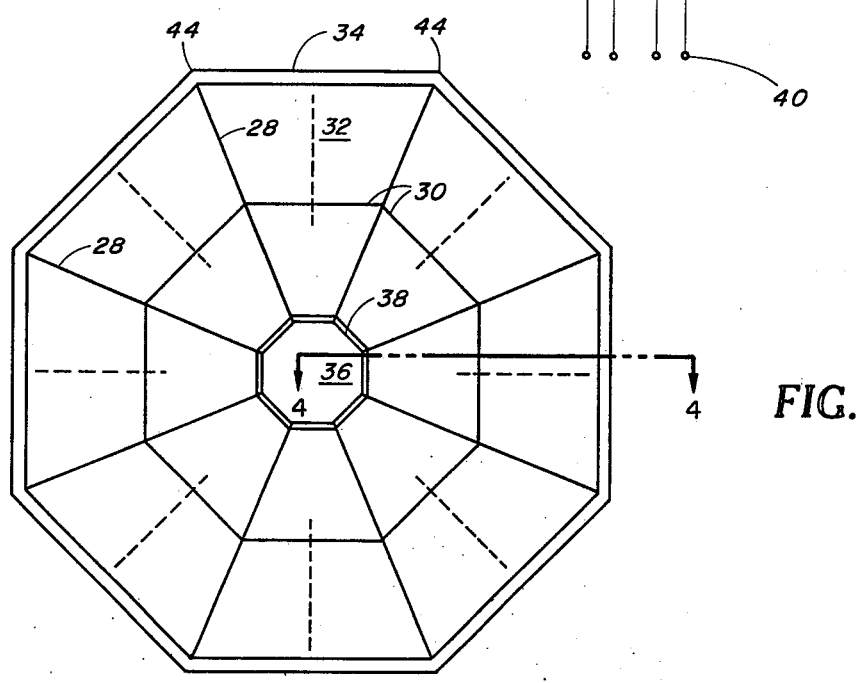

United States Patent Office 3,499,325
Patented Mar. 10, 1970

3,499,325
ATMOSPHERIC DETERMINING APPARATUS
George J. Sloan, Jr., Silver Spring, Md., assignor to the United States of America as represented by the Secretary of the Navy
Filed Dec. 7, 1967, Ser. No. 688,767
Int. Cl. G01w 1/08
U.S. Cl. 73—170
12 Claims

ABSTRACT OF THE DISCLOSURE

An apparatus for determining atmospheric density wherein a ram-air inflated conical aerodynamic body is ejected into the upper atmosphere and is tracked by radar during its descent. The aerodynamic body, constructed of thin metallized plastic film, is packed in a meteorological rocket or gun probe and is ejected near the apogee of the flight where it inflates in a parachute-like manner. The descent is tracked by radar and since the exact dimensions, weight and drag coefficient are known the density of the atmosphere can be derived.

BACKGROUND OF THE INVENTION

This invention relates generally to fluid density determination systems, and more particularly to a ram-air inflated aerodynamic body for determining atmospheric density.

In order to satisfy the present day quest for knowledge of the scientific mysteries of the upper atmosphere, it has become increasingly necessary to accurately predict the environmental conditions existing above the surface of the earth. Many systems have been proposed and utilized in the determination of upper atmospheric density, with varying degrees of success. One such system consists of tracking a descending spherical balloon of known dimension and weight. The spherical balloon utilized in this system must be inflated with a liquid, such as isopentane, which produces a gas to super pressure the sphere. The balloon will remain spherical and serve as a useful density sensor as long as the internal pressure is greater than the surrounding atmospheric pressure. For practical purposes, the super pressure is limited to about 15 millibars, which means that the sphere will collapse at an altitude of about 90,000 feet. A major difficulty with such a system is the inability to verify the results, since the balloon cannot be tracked to obtain usable data during the last 90,000 feet of descent.

SUMMARY OF THE INVENTION

Accordingly one object of the present invention is to provide a new and improved aerodynamic body which is ram-air inflated in a parachute-like manner.

Another object of this invention is the provision of a new and improved ram-air inflated aerodynamic body of known mass, surface area and drag coefficient which has an external configuration and mass distribution such that the body demonstrates a high degree of stability during descending flight.

A further object of this invention is the provision of a new and improved aerodynamic body of known characteristics which will inflate upon release in the upper atmospher, and remain inflated throughout the descending flight.

Briefly, in accordance with one embodiment of this invention, these and other objects are obtained by providing an aerodynamic body for determining atmospheric density having a predetermined mass, drag coefficient and reference area which is released into the upper atmosphere and is tracked during at least a portion of the descending flight to provide data from which atmospheric density can be calculated. By continually increasing the pressure within a cavity in the aerodynamic body such that the internal pressure at least equals the external pressure acting on the body as the body descends, the aerodynamic body remains inflated throughout descent and is tracked during any portion of the flight from the point of release down to sea level. The preferred aerodynamic body for use in determining atmospheric density is a ram-air inflatable parachute-like device having an essentially flat panel member, and a tubular body member defining an external configuration of decreasing peripheral extent having a larger end secured about the periphery of the flat panel member and a smaller open end spaced from the panel member. The external configuration of the aerodynamic body is composed of an upper frustoconical portion secured to the flat panel member and a lower frustoconical portion integral with the upper portion and having a different base angle therefrom. The body may be constructed of thin plastic metallized film and means for adjusting the center of gravity of the body may be provided.

BRIEF DESCRIPTION OF THE DRAWING

A more complete appreciation of the invention and many of the attendant advantages thereof will be readily appreciated as the same becomes better understood by reference to the following detailed description when considered in connection with the accompanying drawings wherein:

FIG. 2 is a side plan view of the aerodynamic body in inflated condition;

FIG. 3 is a top plan view of the aerodynamic body in inflated condition; and

DESCRIPTION OF THE PREFERRED EMBODIMENT

Figure 1:
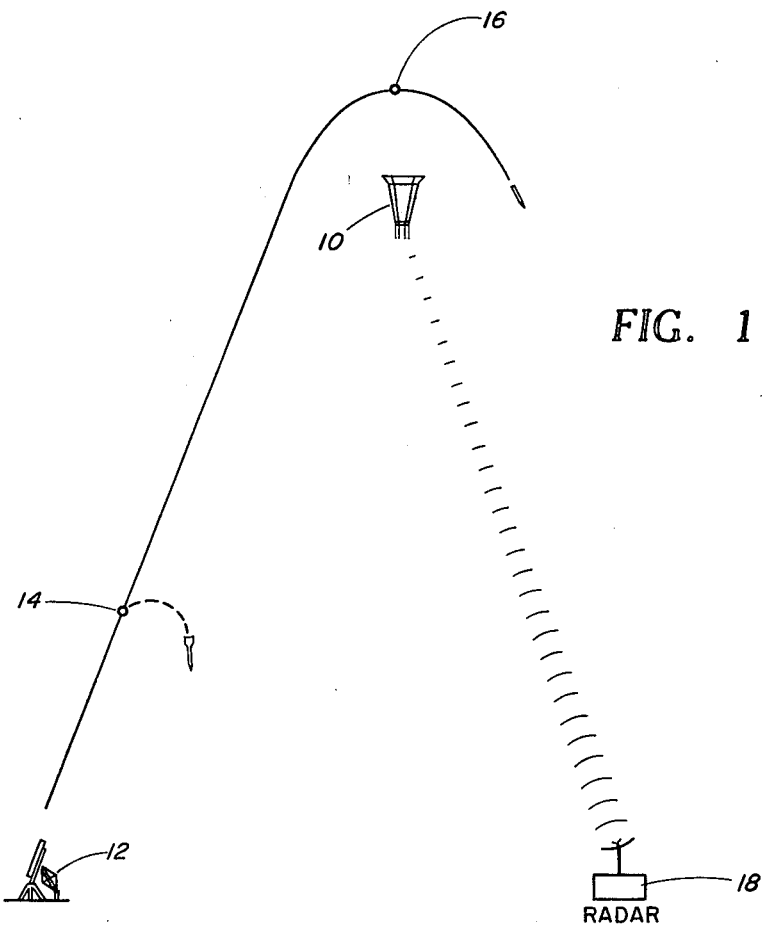
FIG. 1 is a schematic view of the overall density sensing system according to the present invention.

Referring now to the drawings wherein like reference numerals designate identical or corresponding parts throughout the several views, and more particularly to FIG. 1 whereon an aerodynamic body 10 according to the instant invention is packaged in a collapsed folded condition within a rocket to be carried into the upper atmosphere, where at some preselected height, it is separated from the rocket by conventional means, not shown. The rocket is projected into the upper atmosphere from a launching tube illustrated schematically at 12. During an early stage of flight, motor separation occurs as illustrated at 14, and at approximately the apogee of flight 16 the aerodynamic body 10 is released. The body 10, to be more fully described hereinafter, is a ram-air inflated parachute-like aerodynamic shape which will essentially and immediately achieve terminal velocity upon inflation. The body 10 being negatively buoyant in the atmosphere descends toward earth and the velocity at any particular altitude is monitored by a radar 18 from the ground. Since the body is ram-air inflated, the internal pressure will continually increase during descending flight to at least equal the external pressure.

With the velocity of the aerodynamic body having been determined for every level of altitude during flight, the density of the atmosphere for any particular elevation can be calculated from the following equation.

$$F = \tfrac{1}{2}\rho V^2 C_D A$$

where

F aerodynamic force on the body
W weight of the body

ρ density of the fluid medium
V velocity
$C_D$ drag coefficient
A reference area
$V_T$ terminal velocity As the body falls it will reach an aerodynamic state of equilibrium at which point:

$$F=W \text{ and } V=V_T$$

$$W = \tfrac{1}{2} V_T^2 C_D A$$

$C_D$ is determined experimentally in a wind tunnel and is dependent on the shape, velocity, and density and viscosity of the medium.

Since W, $C_D$ and A are known prior to flight and $V_T$ is determined by radar tracking, the density of the atmosphere can be determined.

$$\rho = \frac{2W}{V_T^2 C_D A}$$

Referring now to FIG. 2, the aerodynamic body 10 is shown in the inflated condition in an upright position as it would be oriented during descending flight. The body 10 is constructed of a tubular body member 20 having an upper frustoconical portion 22 and a lower frustoconical portion 24. A preferred method of manufacture of the body portion is the construction of the tubular body member 20 from a plurality of gore panels 26 sealed to each other along their adjacent edges 28 and folded along the line 30. Each panel 26 is preferably constructed of a metatllized thin plastic film for providing a light weight electromagnetic energy reflective surface for radar pickup. It is only necessary to provide a portion of the panel members with a reflective surface, but for the purpose of construction simplicity it has been found desirable to construct the entire panel member of metalized thin plastic film. The upper end of the tubular body member 20 is sealed off by an essentially flat thin plastic panel member 32, which is preferably transparent for inspection purposes. The top panel 32 is sealed about its entire periphery 34 to the upper edges of the gore panels 26.

It can be seen from the foregoing description taken in conjunction with the drawings, that a lightweight aerodynamic body having a biconical tubular body shape closed at the top 32 thereof is provided with a lower end opening 36. Small weights 37 may be provided about the periphery 38 of opening 36 to ensure downward orientation of the aerodynamic body. When variation of the center of gravity of the aerodynamic body 10 is desired, small weights 40 may be suspended from lines 42 below the aerodynamic body.

The particular shape of the aerodynamic body 10 shown in FIG. 2, wherein the upper frustoconical portion 22 has a relatively short longitudinal extent relative to the lower frustoconical portion 24 and the base angle of the upper frustoconical portion 22 is substantially smaller than the base angle of the lower frustoconical portion 24, is purposely designed such that the center of pressure of the aerodynamic body will essentially coincide with the plane of the folding line 30, and the center of gravity of the aerodynamic body will be substantially below the center of pressure. In this manner, proper orientation during descending flight the aerodynamic body is assured, and a high degree of predictable stability is maintained.

A conventional resilient device such as an O-ring 43 may be secured about the peripheral portion 38 of opening 36 to assist in allowing air to rush within the aerodynamic body during inflation. At high altitudes in the upper atmosphere the differential pressure is so great that ram-air inflation takes place essentially instantaneously.

It has been found desirable in the design of the aerodynamic body 10 to provide the top panel member 32 with a polygonal periphery, as shown by the octagonal peripheral portion 34 in FIG. 3. By providing the body 10 with a polygonal exterior configuration, multiple vortices will occur at the points 44 during descending flight. The multiple vortices function to cancel out the tendency of the aerodynamic body to rotate, and thus provide rotational stability to the body 10.

Figure 4:
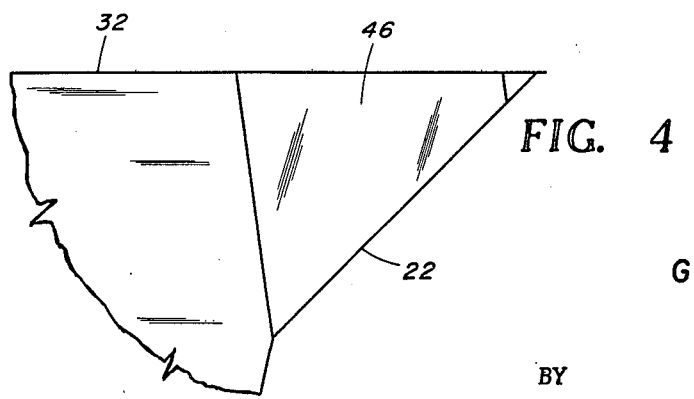
FIG. 4 is a partial sectional view taken along the line 4—4 of FIG. 3.

Referring now to FIG. 4, it can be seen that thin plastic film webs 46 are provided between the top flat panel member 32 and the center line of the upper portion 22 of gore panels 26, and are secured thereto for the purpose of preventing axial bulging of the top panel member 32 away from the tubular body member and maintaining the top panel member 32 in a substantially flat configuration during aerodynamic flight.

Obviously, numerous modifications and variations of the present invention are possible in the light of the above teachings. It is therefore to be understood that within the scope of the appended claims the invention may be practiced otherwise than as specifically described herein.

What is new and desired to be secured by Letters Patent of the United States is:

1. An inflatable aerodynamic body comprising:
   an essentially flat panel member and a tubular body member defining an external configuration of decreasing peripheral extent between a larger end and a smaller end and comprising
      an upper frustoconical having said larger end secured about the periphery of said flat panel and
      a lower frustoconical portion integral with and having a larger base angle than said upper portion and having said smaller end open and spaced from said flat panel member.

2. The device of claim 1 further comprising means for maintaining said panel member in an essentially flat configuration under aerodynamic conditions.

3. The device of claim 1 further comprisig means for maintaining said smaller end open under aerodynamic conditions.

4. The device of claim 1 further comprising means for adjusting the center of gravity of said aerodynamic body.

5. The device of claim 1 wherein said flat panel member is formed of thin plastic film and said body member is formed of thin plastic film having an external metalized reflective surface.

6. The device of claim 5 wherein said flat panel member has a polygonal configuration.

7. An inflatable aerodynamic body comprising:
   an essentially flat top panel member formed of thin plastic film;
   a tubular body member having a large end and a small end and formed of thin plastic film having a metallic reflective surface over a portion thereof and defining an external configuration of decreasing peripheral dimension from said large end to said small end;
   said large end being secured to the periphery of said top panel member;
   web means for maintaining said top panel member in a substantially flat configuration under aerodynamic conditions; and
   resilient means secured to said small end for maintaining an open disposition thereof under aerodynamic conditions.

8. The aerodynamic body of claim 7 wherein said web means comprises a piece of material connected between a portion of said top panel member and said tubular body member whereby said top panel member is restrained from axial bulging away from said tubular body member.

9. The aerodynamic body of claim 7 further comprising means for adjusting the center of gravity of said aerodynamic body including weight means connected to the lower portion of said body.

10. The aerodynamic body of claim 7 further comprising an upper frustoconical portion secured around the periphery of said flat panel, and a lower frustoconical portion integral with said upper frustoconical portion and having a different base angle therefrom whereby the center of pressure in said body under aerodynamic conditions is closer to the flat panel member than is the center of gravity of said body, thereby enhancing aerodynamic stability.

11. The aerodynamic body of claim 7 wherein said tubular body portion comprises a plurality of flat sheets joined along their adjoining edges to produce a tubular body of polygonal cross-section.

12. The aerodynamic body of claim 11 wherein the configuration of said flat top panel member is a polygon similar to said tubular body cross-section.

References Cited

UNITED STATES PATENTS

| 2,993,667 | 7/1961 | Cushman | 244—142 |
| 3,160,879 | 12/1964 | Downing et al. | 343—18 X |
| 3,340,732 | 9/1967 | Scoggins | 73—189 |
| 3,234,503 | 2/1966 | Wojciechowski et al. | 244—142 X |

RICHARD C. QUEISSER, Primary Examiner

J. W. MYRACLE, Assistant Examiner

U.S. Cl. X.R.

244—142